Nov. 18, 1969     A. PITNER     3,478,540
UNIVERSAL JOINT
Filed July 3, 1967
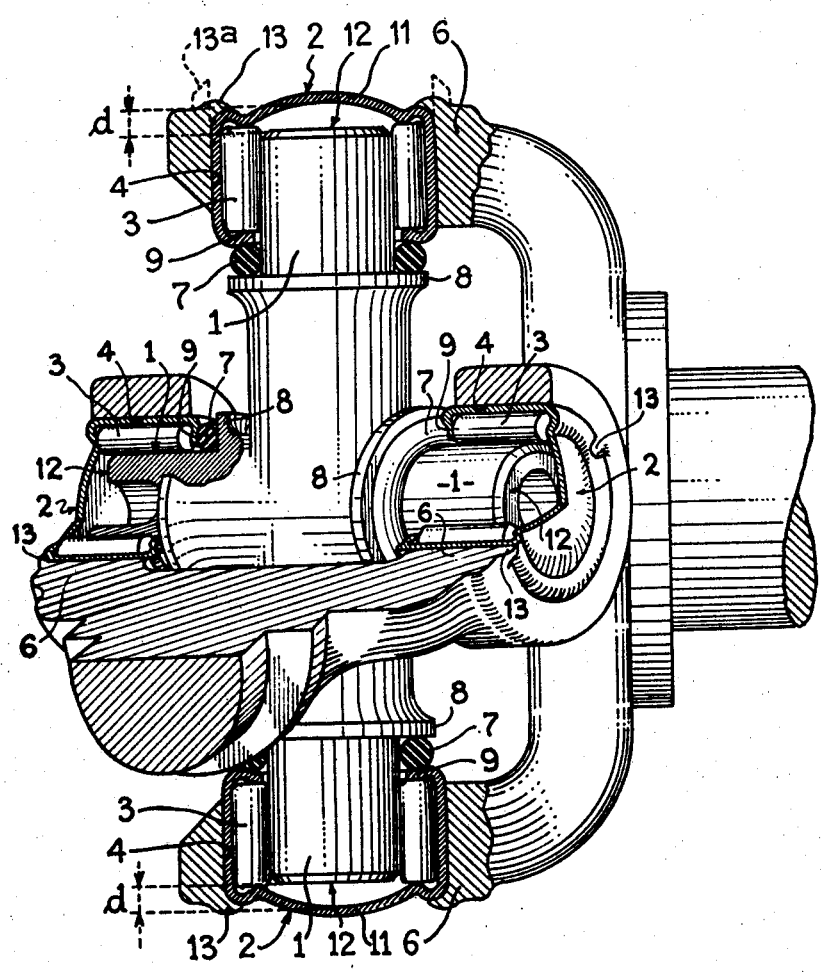

United States Patent Office 3,478,540
Patented Nov. 18, 1969

3,478,540
UNIVERSAL JOINT
Alfred Pitner, Paris, France, assignor to Nadella S.A., Rueil-Malmaison, France, a French body corporate
Filed July 3, 1967, Ser. No. 651,353
Claims priority, application France, Sept. 29, 1966, 78,091
Int. Cl. F16d 3/24
U.S. Cl. 64—17                5 Claims

ABSTRACT OF THE DISCLOSURE

A universal joint in which the end face of each journal of the cross-shaped member of the joint is spaced from the end wall of the corresponding needle bearing cup a given distance owing to the support offered by the corresponding sealing ring, disposed between a shoulder on the journal and the cup, to a radial flange of the cup, the sealing ring thus also performing the function of a spacer and abutment member.

---

The present invention relates to universal joints having two yokes and a cross-shaped member having four journals which are respectively capped by needle cups maintained in corresponding smooth bores formed in the yokes.

In such universal joints it is known to seal each cup by means of a solid ring which is slightly elastic and is crushed between a shoulder on the journal and a radial flange on the cup, this crushing being achieved when assembling by application of the transverse end wall of the cup against the end face of the cross-shaped member.

The present invention differs from this known arrangement and has for object to provide a universal joint wherein the end face of each journal of the cross-shaped member is spaced from the end wall of the cup a given distance owing to the support offered to the radial flange of the cup by the sealing ring which thus performs the function of a spacer and an abutment element.

Said space of course represents an appreciable difference in dimension which is much greater than the assembly or operational clearance usually employed. Such an arrangement is advantageous in some applications since it enables the cost to be reduced owing to the elimination of costly machining operations on the end face of the journal or eliminating the cause of noise produced by the contact of this face with the cup if no relatively costly assembling means are employed for eliminating the axial clearance.

The function of the spacer member can be performed by the sealing ring which has for example a circular or a bi-, tri- or quadri-lobar section having, if desired, one or more sealing lips, owing to its low axial elasticity. With no need to employ costly machining or assembling means, the ring thus achieves a relative centering of the parts.

The force fit of the cup in the bore of the corresponding yoke is amply sufficient in most cases to ensure that the assembly is maintained, this assembly being defined by a compression of the sealing ring of a given value. It is, however, possible to complete this assembly for example by a cold adhesion or by a kind of insertion resulting in the known manner from forming over onto the end walls of the cups projections such as forging beads which are initially oriented in the axial direction of the journals. If desired, these projections or beads can be calibrated in height when the bore of the yoke is being produced, with no need for a further operation.

Further features and advantages of the invention will be apparent from the ensuing description with reference to the accompanying drawing.

The single figure represents the assembly of two journals of a cross-shaped member with a yoke in a universal joint according to the invention.

The two journals 1 are clamped with a cup 2 for needles 3 which is fitted in a corresponding bore 4 of the yoke 6. Each cup is sealed by a circular-sectioned ring 7 of elastomer which is crushed between a flange 8 on the journal and a radial flange 9 formed on the free end of the cup.

The relative dimensions, measured along the axis of the journal 1, of the cup 2, of the ring 7 and of the journal starting at the shoulder 8, are such that the ring 7 constitutes a spacer member or abutment means having a centering action which—upon assembly and notwithstanding the compression thereof for achieving the seal—limits the travel of the cup 2 when mounting it in the bore, the end wall 11 of the cup being finally spaced from the end face 12 of the journal an appreciable distance $d$.

As described in a similar manner in the U.S. Patent No. 3,029,618, the fitting of the cups 2 can be completed by clasp means 13 which is achieved in the presently-described embodiment by a radial crushing, into contact with the end walls of the cup, of small tongue portions 13a, such as forging beads, which initially exist as axial projections on the ends of the bore of the yoke.

Although a specific embodiment of the invention has been described, many modifications and changes may be made therein without departing from the scope of the invention as defined in the appended claims.

Having now described my invention what I claim as new and desire to secure by Letters Patent is:

1. In a universal joint comprising two yokes, a cross-shaped member having four journals, four needle bearing cups having end walls and respectively mounted on the journals, four bores in the two yokes and respectively containing said cups, means for preventing outward axial movement of said cups relative to said bores, a shoulder on each journal, a radial flange on each cup and a solid slightly elastically yieldable sealing ring interposed in an axially compressed state between the radial flange of each cup and said shoulder on the corresponding journal for sealing each cup, the feature that the outer end of each journal of the cross-shaped member is in wholly spaced relation to said end wall of the corresponding cup a given distance owing to the support offered to the radial flange of the cup by the sealing ring which has such compressibility axially of the journal that the axial compression of the ring is less than said given distance under conditions of operation for which the joint is intended, whereby the ring performs the function of a spaced and an abutment element in joint operation.

2. A joint as claimed in claim 1, wherein the sealing ring is a circular-sectioned ring prior to being axially compressed.

3. A joint as claimed in claim 1, comprising for maintaining each cup, initially axial tongue portions which are provided on the corresponding yoke and formed over onto the end wall of the cup.

4. A joint as claimed in claim 3, wherein the tongue portions are forging beads.

5. In a universal joint comprising a cross-shaped member having two pairs of diametrally opposed journals, four rolling bearings which include outer bearing members having outer races and are respectively mounted on said journals, two yokes each having an axis of rotation, two bores in each of said yokes in which bores said outer bearing members are located, means for preventing said outer bearing members from moving within the corresponding bores radially away from the axis of rotation of the corresponding yoke, a shoulder on each journal, a radial face on each bearing member, and an elastomer sealing ring in an axially compressed state, interposed between the shoulder of each journal and radial face of the corresponding outer bearing member; the feature that each journal is adapted to be movable within the corresponding outer bearing member radially away from the axis of rotation of the corresponding yoke an extent which exceeds any axial play which could normally result from manufacturing tolerances and exceeds any possible axial compression of the corresponding sealing ring under conditions of operation for which the joint is intended, whereby said cross-shaped member is held centered between the outer bearing members of each yoke solely by the supporting action of the corresponding axially compressed sealing rings, with no possibility of direct abutment of the journals against their corresponding outer bearing members under said conditions of operation.

References Cited

UNITED STATES PATENTS

| | | | |
|---|---|---|---|
| 1,604,202 | 10/1926 | Smith-Clarke | 64—17 |
| 2,597,240 | 5/1952 | Greiner | 64—17 |
| 2,903,868 | 9/1959 | Stillwagon | 64—17 |

FOREIGN PATENTS

| | | |
|---|---|---|
| 1,228,019 | 3/1960 | France. |
| 1,001,170 | 8/1965 | Great Britain. |

HALL C. COE, Primary Examiner

U.S. Cl. X.R.

308—187.1

UNITED STATES PATENT OFFICE
CERTIFICATE OF CORRECTION

Patent No. 3,478,540   Dated November 18, 1969

Inventor(s) Alfred Pitner

It is certified that error appears in the above-identified patent and that said Letters Patent are hereby corrected as shown below:

In the heading, column 1, line 3, --of one-half interest-- should be inserted after "assignor".

SIGNED AND
SEALED
JAN 19 1971

(SEAL)
Attest:

Edward M. Fletcher, Jr.
Attesting Officer

WILLIAM E. SCHUYLER, JR.
Commissioner of Patents